(12) United States Patent
Gramza

(10) Patent No.: US 7,814,866 B1
(45) Date of Patent: Oct. 19, 2010

(54) BACK AND ABDOMINAL SUPPORT, QUICK RELEASE, BODY BAND FOR HANDS-FREE DOG WALKING

(76) Inventor: Dale Gramza, 11749 Manitou, Alden, NY (US) 14004

( * ) Notice: Subject to any disclaimer, the term of this patent is extended or adjusted under 35 U.S.C. 154(b) by 783 days.

(21) Appl. No.: 11/786,623

(22) Filed: Apr. 12, 2007

(51) Int. Cl.
*A01K 27/00* (2006.01)

(52) U.S. Cl. ...................................... 119/770; 119/865

(58) Field of Classification Search ................ 119/770, 119/769, 792, 857, 863, 865, 776, 795; 602/19
See application file for complete search history.

(56) References Cited

U.S. PATENT DOCUMENTS

| | | | | |
|---|---|---|---|---|
| 4,833,730 | A * | 5/1989 | Nelson | 2/44 |
| 4,964,401 | A * | 10/1990 | Taigen | 482/93 |
| 5,074,795 | A * | 12/1991 | Clark | 434/253 |
| 5,080,045 | A | 1/1992 | Reese et al. | |
| 5,161,486 | A | 11/1992 | Brown | |
| 5,299,325 | A * | 4/1994 | Kamber et al. | 2/338 |
| 5,421,809 | A * | 6/1995 | Rise | 602/19 |
| 5,484,395 | A * | 1/1996 | DeRoche | 602/19 |
| 5,539,933 | A * | 7/1996 | Garber et al. | 2/311 |
| 5,586,969 | A * | 12/1996 | Yewer, Jr. | 602/19 |
| 5,690,122 | A * | 11/1997 | Weber-Unger | 128/876 |
| 5,718,189 | A | 2/1998 | Blake | |
| 5,785,011 | A * | 7/1998 | Gitterman, III | 119/865 |
| 5,842,444 | A | 12/1998 | Perrulli | |
| 5,950,569 | A | 9/1999 | Perrulli | |
| 6,058,513 | A * | 5/2000 | Simmons et al. | 2/312 |
| 6,192,835 | B1 | 2/2001 | Calhoun et al. | |
| 6,851,393 | B2 * | 2/2005 | Bremm | 119/770 |
| 6,921,375 | B2 * | 7/2005 | Kihara | 602/5 |
| 6,932,027 | B1 * | 8/2005 | Whitney | 119/770 |
| 6,971,476 | B2 * | 12/2005 | Wolner et al. | 182/3 |
| 7,096,511 | B2 * | 8/2006 | Cohen | 2/206 |
| 7,160,262 | B2 * | 1/2007 | Wicks | 602/19 |
| 7,267,080 | B2 * | 9/2007 | Gallo et al. | 119/770 |
| 7,311,063 | B2 * | 12/2007 | Goldberg | 119/771 |
| 7,353,779 | B2 * | 4/2008 | Altieri | 119/770 |
| 7,568,967 | B2 * | 8/2009 | Smith | 450/1 |
| 7,575,136 | B2 * | 8/2009 | Kernkamp | 224/159 |
| 7,640,600 | B2 * | 1/2010 | Reder | 2/104 |
| 2004/0221818 | A1 * | 11/2004 | Rother et al. | 119/770 |
| 2007/0034163 | A1 * | 2/2007 | Gallo et al. | 119/770 |
| 2009/0101083 | A1 * | 4/2009 | Colla | 119/770 |

OTHER PUBLICATIONS

"Walky Belts" http://freespace.virgin.net/chilli.dog/catwalkbelts.htm.
"The Running Dawg" http://www.runningdawg.com.
"The DawgByte Dog Belt" http://orik.com/dogbelt/.
"Hands-Free Dog Jogger Leash" http://www.dogjogger.com.
"Releash Hands-Free Dog Activity Leash" http://www.pawshop.com/thepawshop/rehadogle.html.

* cited by examiner

*Primary Examiner*—Yvonne R. Abbott
(74) *Attorney, Agent, or Firm*—Patricia M. Costanzo

(57) ABSTRACT

A rapid release, size adjustable, hands-free, back-supporting resilient band animal walking device is taught. The device provides a way to securely attach and position the leash so that the animal is constrained to walk within the filed of the walker's vision, reducing, if not eliminating, the ability of the animal to pull the walker backwards or sideways. The device provides for movements made by the person walking the animal to be transmitted to the animal minimizing the animal's urge to make sudden pulls and/or lunges, thus making animal walking a more comfortable, safe, and healthy experience. The belt part of the device is wide enough to prevent the belt from "digging into" the users back when a strong dog pulls against the leash. Moreover, the device is designed to prevent the belt/leash connecting parts from coming into contact with the groin area, which is especially appreciated by male users.

1 Claim, 6 Drawing Sheets

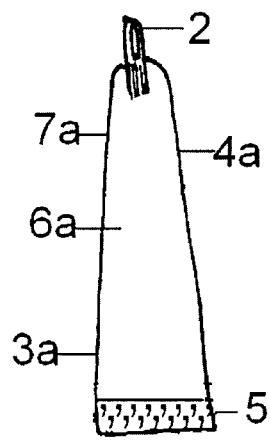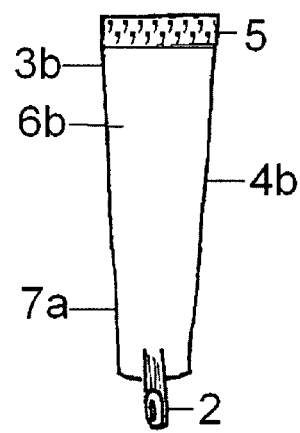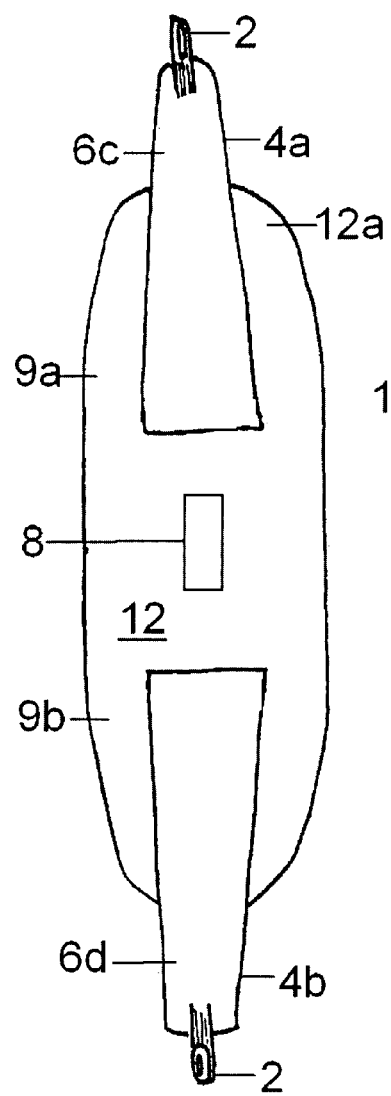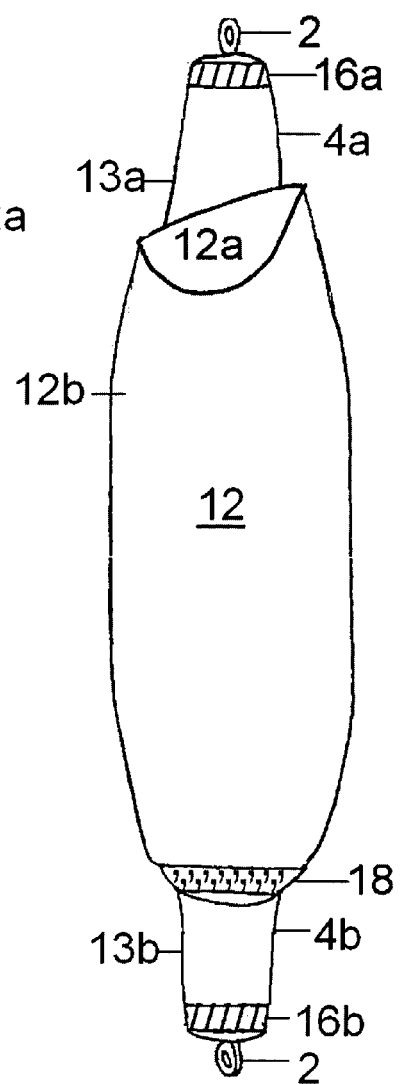
FIG. 1a  FIG. 1b  FIG. 1c

BACK AND ABDOMINAL SUPPORT, QUICK RELEASE, BODY BAND FOR HANDS-FREE DOG WALKING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to a dog walking device and, more particularly, to an easy to use, quick leash release, comfortable body band that provides for hands-free dog walking, back and abdominal support for the dog walker, and directional security for the walked dog, without the discomfort of the leash holding device bumping against the groin area.

The background information discussed below is presented to better illustrate the novelty and usefulness of the present invention. This background information is not admitted prior art.

According to United States Pet Ownership Statistics, a study conducted by the American Pet Products Manufacturers Association (APPMA) 2003-2004 National Pet Owners Survey, there are approximately sixty-five million owned dogs in the United States, with thirty-nine percent of households owning at least one dog. All dogs benefit from being walked and dog-walking should be a fun and relaxing activity. It is a good way to spend time with a beloved canine companion and provides a means of exercise that benefits both the dog walker and the dog.

The U.S. Department of Labor reported 141.5 million people to be employed in the United States with many of these workers from households that depend on two incomes. This means that many homes may be left vacant for long periods during the day and that the dogs who reside in these houses are left indoors for these long periods. For many dogs, this also means being kept locked in a crate. While it is true that not everybody who works also owns a dog, a quick comparison of both pet ownership statistics and employment statistics reveal that a large portion of dog owners are, indeed, absent for lengthy portions of the day. Considering this, it is important to recognize that dogs require attention and exercise upon their owner's return.

Not only is exercise important for dogs, it is also important for dog owners. Current statistics reveal that fifty-eight million Americans are classified as overweight, forty million as obese, and three million as morbidly obese. This means that eight of ten adults over the age of twenty-five are overweight, and seventy-eight percent of Americans are not meeting their basic activity level recommendations. The growing problem of childhood obesity is also one that cannot be ignored. While only four percent of children were considered to be overweight in 1982, today sixteen percent of all children are considered obese. Additionally, one in four overweight children has already begun to show early signs of type II diabetes and sixty percent already have one risk factor for heart disease. With these alarming facts, it is not surprising that hospital costs associated with childhood obesity have increased from $35 million in 1979 to $127 million in 1999. Given that obesity is an escalating problem throughout society, it is easy to appreciate that the exercise provided during the activity of dog-walking is as beneficial to the owner not only for weight maintenance, but to ensure overall health.

According to the American Heart Association, nearly twenty-five percent of people are totally sedentary. Scheduling a small portion of time for a simple exercise, such as dog-walking, may be extremely important for people who are trying to improve their health. In addition to keeping weight under control, daily walking reduces the risk of heart disease by enhancing blood circulation throughout the body, reduces blood cholesterol levels, prevents and manages high blood pressure, and prevents bone loss. Additionally, many people who make time to walk their dog experience lower levels of stress and tension, as well as reduced levels of anxiety and depression.

Establishing good exercise habits, such as a daily routine of dog-walking, is important. Dog walking is a relatively simple activity which should be non-taxing and should provide a pleasurable way to spend time with one's pet. Moreover, children who are taught to spend time walking a family dog are likely to continue such activities throughout their lives.

Considering the fact that obesity is now a problem for animals as well, it is just as crucial that they get the level of exercise they need. Obesity in pets causes many of the same problems that it does in people. These problems include diabetes, hip dysphasia, and over-angulated joints, as well as breathing and heart troubles. Obesity adds to a dog's pain, such as the pain suffered by a dog that has arthritis, which, of course, causes a greatly reduced quality of life. Obesity, however, is preventable and largely reversible with some form of daily exercise.

Responsible dog owners understand the great importance of using a leash while walking their dogs, Various cities and towns strictly enforce leash laws, meaning that if a dog is off the owner's property, it must be controlled by a leash. These laws are vital for the safety of the dog as well as the general public. Pet walker's have no control where an unleashed dogs would leave their droppings. And, even the best-trained dog may not be entirely trustworthy off of its lead. For these reasons and others, it is imperative that a leash be used whenever a dog is being walked.

The use of a leash while walking a dog can be used as a means of communication between dog and owner. When on a leash, the dog should be able to sense the walker's body movements and to eventually learn to recognize and respond to various walking behaviors, such as turning, slowing down, speeding up, and stopping. The ability of a leash to transmit even subtle movements made by the person walking to the dog is important at most times, but is especially important when training a puppy.

Although there are countless benefits to dog walking, the activity also poses several potential risks. If the owner does not have complete control over his dog, both dog and owner may strain their muscles if the dog unexpectedly and vigorously resists the leash. Moreover, if an owner should happen to lose his grasp of a hand-held leash, the dog could escape and be at risk of getting hit by a car or could potentially attack another animal or a human.

People who wish to power-walk, jog, or run with their dogs often feel that holding a leash interferes with their arm movements, therefore prohibiting them from gaining the maximum benefit of their exercise. Additionally, the swinging motion of the arm may stress an animal's neck and head region and may also interfere with the rhythm of a natural stride. An upward motion of the owner's arm will shorten the leash, thereby placing an undesirable force on the animal's neck. A downward motion of the arm may produce slack in the leash which would allow the animal to accelerate, which may result in an undesirable force on the user.

According to a study published in the "Animal Behavior Consultants Newsletter" in July of 1992, 63% of the dogs examined had neck and spinal injuries. Nearly 78% of dogs with aggression or over-activity problems were found to have these injuries, and of the dogs with neck injuries, 91% had experienced hard jerks or had strained while on a leash.

There are many devices that attempt to address the problems presently associated with walking a dog and using a leash. One such device attempts to solve this problem by providing for a hands-free leash system that allows hands-free use when the animal is connected to the leash. The system comprises a waist belt, a leash, and a collar adapter/connector. A two-point attachment system on this particular device is provided for use with a second dog. Both of the leash attachment points on the belt are assemblies that have been adapted to slide independently along the length of the belt, preferably all the way around the belt, supposedly so that one or both pets may maneuver around the user without tangling or twisting of the leash system. If the two dogs, however, decide to cross paths while each is headed in similar directions, the dog's leashes could easily become tangled. Moreover, it would be easy for the dogs to overpower their handler if both animals pulled in the same direction. Additionally, having a dog, or dogs, pulling against the handler from the handler's rear or side could easily pull the handler until the handler lost balance and fell. This system, therefore, appears inherently dangerous to use. Besides being dangerous, the use of this belt probably causes considerable discomfort when walking dogs of appreciable size and weight. As the dog being walked pulls away from the handler, the narrow belt of this invention is pulled into the waist area of the user creating discomfort and back strain. What is needed is a band or belt that is wide enough to prevent the belt from being pulled into the waist area of user to prevent both discomfort and back strain.

Preventing a back injury is much easier than repairing one and as most back injuries arise from improper use of back muscles, health care providers recommend avoiding low back strain by avoiding high and/or sudden force on the back. It is not unlikely that walking a dog may result in the walker suffering a sudden pulling force on his or her back muscles. Larger dogs, a plurality of dogs, and very active animals often turn what should be a fun and relaxing exercise experience into a strenuous and tiring event. Having strong back muscles is important in order to ease the work your back is put through each day. Many people, however, do not have optimally strong back muscles. When persons with underdeveloped back muscles walk their dogs hoping to increase the strength of their back muscles, they might be doing more harm to their back than good because of the sudden strains experienced when their dogs lunge and pull on the leash. What would be appreciated would be the means to walk a dog or dogs that would simultaneously protect the walker's back from hurtful strains.

Another device offers a hands-free leash system that incorporates the use of a belt part and a flexible cord part. The belt part has two attachment points for attaching the flexible cord part to the belt part. The two attachment points are positioned on the belt so that once the belt part is attached about a person, one attachment point is on one side of the wearer's body and the other attachment point is on the other side of the wearer's body. Each end of the flexible cord is then attached to one of the belt's attachment points so that the flexible cord drapes down over the front of the wearer's body from the waist belt. Any presently available dog leash (which is, of course attached to a dog) is then attached to the lowest or central part of the flexible cord. This two-point attachment system for attaching the cord to a person's waist attempts to eliminate the possibility that an animal's movements could inadvertently throw a person off balance by having the attachment points located one on each side of a person's torso. However, the flexible cord device hangs in such a way that when the animal and handler are at rest, the metal loop of the leash that is attached to the belt hangs in such a way that the metal loop and the straps in the immediate vicinity are positioned to repeatedly bump into the groin area of the person using the apparatus. This is especially uncomfortable and even painful for male users. What would be appreciated is a device that avoided the central part of the leash connecting parts from coming into contact with the user's body, especially avoiding contact with the groin area.

Another device attempts to address the need for hands-free operation by offering an upper-arm mounted device which permits the user to exercise utilizing a swinging arm motion. An elastic band is utilized, in an effort to minimizing the negative forces created by swinging to the animal. The use of this device to walk any but the smallest dog could easily result in a strained or sprained arm or even in a dislocated shoulder. Moreover, the center of gravity of the person walking the dog is shifted because of the pull and weight of the attached dog and could easily cause the user to fall.

A similar effort teaches a thigh strap that may be worn by the user, with a clip allowing for the quick-reconnect of an animal's leash. A pouch is also included in the apparatus, which can be used for carrying dog food or other training treats. A device that attaches a leashed dog to a user's leg, in a manner similar to the device that attaches a leash to a user's arm, would likely suffer from the same types of problems, such as the use of this device to walk any but the smallest dog could easily result in a strained or sprained arm or even in a dislocated shoulder, and likewise, the center of gravity of the person walking the dog is shifted because of the pull and weight of the attached dog and could also cause the user to fall.

Therefore, it is obvious that there is still a need in the art for a hands-free dog walking device that protects a dog walker's back from the strain caused by the leashed animal's sudden pulls and lunges on the walking leash. Moreover, the device should have a means to securely attach and position the leashes used for walking the dogs to the device to reduce the occurrence of tangled leashes if more than one dog is being walked. It is important that the ability of a dog being walked to pull the walker backwards or sideways is reduced, if not eliminated. It is also desirable to have a device that reduces the animal's urge to make sudden pulls and/or lunges in order to make walking dogs a comfortable, safe, and healthy experience. The belt part of the device should be designed to be wide enough to prevent the belt from "digging into" the users back when a strong dog pulls against the leash and even offers back support to make walking dogs a comfortable, safe, and healthy experience. Moreover, the device should be designed to avoid the central part of the leash connecting parts from coming into contact with the user's body, especially avoiding contact with the groin area, would be appreciated. The device should not be attachable to a users arm or leg to avoid the user suffering from a strained or sprained arm or even in a dislocated shoulder and the device should be adjustable for all sizes.

SUMMARY

The present invention satisfies the current unmet need for an improved device for a hands-free animal walking device that comprises a resilient band that supports a dog walker's back and abdomen protecting the walker from the strain caused by a leashed animal's sudden pulls and lunges while attached to the walking leash. Moreover, the device provides a way to securely attach and position the leash so that the animal is constrained to walking within the field of the walker's vision, which also reduces, if not eliminates, the ability of an animal being walked to pull the walker backwards or sideways. Because the device provides constant elastic tension even subtle movements made by the person walking the animal are transmitted to the animal minimizing the animal's urge to make sudden pulls and/or lunges, thus making animal walking a comfortable, safe, and healthy experience. The belt part of the device is wide enough to prevent the belt from "digging into" the users back when a strong dog pulls against the leash and belt and to provide support for the walker's back. Moreover, the device is designed to prevent the belt/leash connecting parts from coming into contact with the user's body, thus avoiding the groin area, which is especially appreciated by male users. The device is adjustable for all sizes.

All these advantages are made available by providing for a quick release, hands-free back-supporting body-band animal walking device, comprising:
 a) a resilient band having:
  i) a first band end and a second band end, and
  ii) a first band side and a second band, the first band side comprising loop material, and the second band side comprising at least one strip of hook material wherein the connection and separation of the loop material to and from the hook material provide for rapid detachable attachment and detachment of the band to and from an animal walker, and
 b) a first and a second leash attachment strap, each of the straps having:
  i) hook material attachment means fixed on a first end of a first side providing for rapidly and fixedly attaching and rapidly detaching the first and second leash attachment straps to and from the first band end and the second band end, respectively, of the first side of band, and
  ii) connection means fixed to a second end of each of the first and second leash attachment straps providing for detachable attachment of a leash attachment means wherein the leash attachment means provides for attachment of a leash to the device, and
  iii) hook material fixed proximate to the second end of a second side of one of the leash attachment straps and loop material proximate to the second end of a second side of the other one of the leash attachment straps providing for detachable attachment of the first and said second leash attachment straps to each other providing for the attachment straps to be maintained away from the groin area of the walker's body while an animal is being walked,
 wherein the back-supporting device provides for hands-free walking of an animal constraining the animal to walk approximately in the field of the walker's vision.

Yet another embodiment teaches a method for making a hands-free back-supporting body-band animal walking device, comprising the steps of:
 a) providing for an elastic band having:
  i) a first band end and a second band end, and
  ii) a first band side and a second band, the first band side comprising loop material, and the second band side comprising a strip of hook material, providing for detachable attachment of the band about an animal walker, and
 b) providing for a first and a second leash attachment strap, each the strap having:
  i) hook material attachment means on one end of each of the first and second leash attachment straps;
  ii) attaching detachably the first and the second leash attachment straps to the first band end and to the second band end, respectively of the first side of the band, wherein
  connection means fixed to a second end of each of the first and second leash attachment straps provide for detachable attachment of a leash attachment means wherein the leash attachment means provides for attachment of an animal walking leash to the device for back-supported hands-free leashed animal walking by a walker, and
  iii) providing for hook material proximate to the second end of one of the leash attachment straps and loop material proximate to the second end of the other one of the leash attachment straps providing for detachable attachment of the first and the second leash attachment straps to each other providing for the attachment straps to be maintained away from the groin area of the walker's body while an animal is being walked,
 wherein the back-supporting device provides for hands-free walking of an animal constraining the animal to walk in the path of the walker's eyesight.

Yet still another embodiment, teaches a two-piece, hands-free, back and abdominal supporting, body-band, animal walking device, comprising:
 a) a resilient band having:
  i) a width;
  ii) a first end and a second end, and
  iii) a first side and a second side,
  with loop material on the first side, and at least a strip of hook material on the second side providing for rapid placement of said band on to and removal off of a user's mid-section,
  the width of the band sufficient to provide abdominal and back support to the user when the band is secured about the user's midsection,
 b) a leash attachment strap, said strap having:
  i) a first strap end, a second strap end, and a mid-section;
  ii) an outer side and an inner side;
  iii) hook material on the inner side of the first strap end and on the inner side of the second strap end providing for nearly instantaneous attachment and detachment of the leash attachment strap to and from the resilient band,
  iv) leash connection means affixed to the outer strap side of the mid-section of the leash attachment strap, the leash attachment means providing for detachable attachment of an animal walking leash to body-band animal walking device,
 wherein the back and abdominal supporting body-band animal walking device provides for hands-free walking of an animal constrained to walk in a path defined by the walker's eyesight.

Furthermore, wherein the mid-section of the leash attachment strap is folded at its midpoint so that the inner sides of the mid-section parts contact and are adhered to each other which adherence provides for the attachment strap to be maintained away from the groin area of the walker's body while an animal is being walked.

Alternatively, the leash attachment strap may further comprise:
  a) a first strap part with a first end, a second end, a first side, and a second side, the second side of the second end comprising a strip of hook material, providing for rapid attachment and detachment of the first strap part to the loop material of the first side of the first end of the band, and
  b) a second strap part with a first end, a second end, a first side, and a second side, the second side of the second end comprising a strip of hook material, providing for rapid attachment and detachment of the first strap part to the loop material of the first side of the second end of the band,
  wherein the second side of the first end of the first strap part and the second side of the first end of the second strap part are fixedly attached to each other forming the mid-section of the leash attachment strap,
  the fixed attachment providing for the attachment straps to be maintained away from the groin area of the walker's body while an animal is being walked.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope. Thus, the invention will be described and explained with additional specificity and detail through the use of the accompanying drawings, in which:

FIG. 1a is a plan view illustrating first and second leash attachment straps used to attach a leash to the back-support body-band device of the present invention.

FIG. 1b is a plan view illustrating the first and second leash attachment straps, as shown in FIG. 1a, securely, yet reversibly, attached to the outer side of the back-support body-band device of the present invention.

FIG. 1c is a plan view of the inner side of the back-support body-band device illustrating the first and second leash attachment straps, as shown in FIG. 1a, securely, yet reversibly, attached to the outer side of the back-support body-band device of the present invention.

A LIST OF REFERENCE NUMERALS AND PARTS OF THE INVENTION TO WHICH NUMERALS REFER

Figure 2:
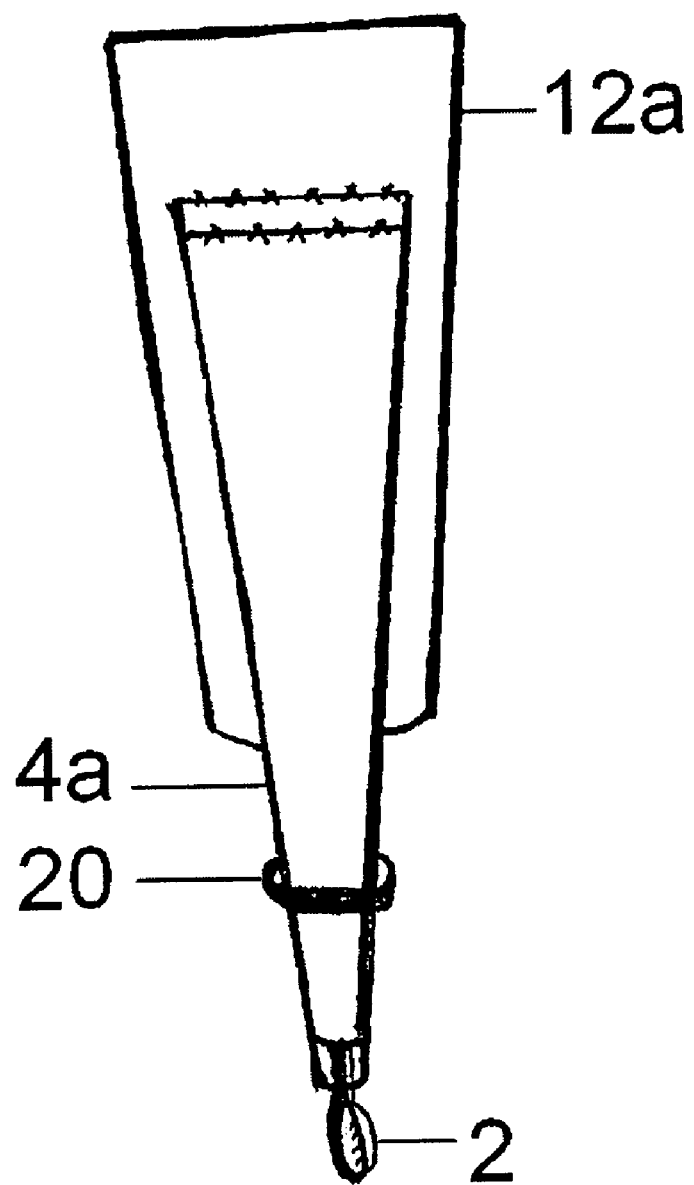
FIG. 2 is a perspective view illustrating optional or additional means 20 of attaching leash attachment straps to each other.

2 Ring-like means for holding leash attachment means 30.
3a First end of 4a.
3b First end of 4b.
4a First leash attachment strap.
4b Second leash attachment strap.
5 Hook-material on 4a and 4b.
6a Side of first leash attachment strap 4a that is positioned against outer side of back-support body-band 12a and toward user's body.
6b Side of second leash attachment strap 4b that is positioned against outer side of back-support body-band 12a and toward user's body.
6c Side of first leash attachment strap 4a that is positioned away from outer side of back-support body-band 12a and away from user's body.
6d Side of second leash attachment strap 4b that is positioned away from outer side of back-support body-band 12a and away from user's body.
7a Second end of 4a.
7b Second end of 4b.
8 Optional reflective strip for night wear safety.
9a First band end of 12.
9b Second band end of 12.
10 Back-support body-band device for hands-free dog walking.
12 Back-support body-band.
12a Outer loop-material side of back-support body-band.
12b Inner-side of back-support body-band.
13a Second side of first leash attachment strap.
13b Second side of second leash attachment strap.
16a First part of hook and loop attachment means for attaching leash attachment straps together.
16b Second, mating, part of hook and loop attachment means for attaching leash attachment straps together.
18 Hook-material part of attachment means for reversible positioning of body-band part about a user's midsection.
20 Optional means for attaching leash attachment straps together.
30 Exemplary leash attachment means for attaching a leash to the back-support body-band device.
40 Back-support body-band device in use.
50 Stitching means attaching leash attachment straps 4a and 4b to back-support body-band 12.
60 Back-support body-band device.
61a First side of band.
61b Second side of band.
62 Resilient body band for fitting and wearing about a walker's waist area.
64 Hook-material part of attachment means for reversible attachment of back-support body-band device 60 about a user's mid-section.
65a First end of band.
65b Second end of band
66 Loop-material surface for reversible attachment of back-support body-band device 60 about a user's mid-section.
70 One piece leash attachment strap.
71a A first strap part.
71b A second strap part.
72 Another exemplary leash attachment means for attaching a leash to the back-support body-band device.

73a A first end of first strap part 71a.
73b A first end of second strap part 71b.
74 Hook-material part of one piece leash attachment strap 70 for reversible attachment of leash attachment strap 70 to back-support body-band device 62.
75a A second end of first strap part 71a.
75b A second end of second strap part 71b.
77a A second side of first strap part 71a.
77b A second side of second strap part 71b.
76 Stitching means.
78 Midsection of band.

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein.

The present invention is directed towards a rapid release, size adjustable, hands-free, back and abdominal supporting resilient band animal walking device. The device provides a way to securely attach and position a leash to a body band so that the animal is constrained to walk approximately within the field of the walker's vision, reducing, if not eliminating, the ability of the animal to pull the walker backwards or sideways. The device also provides for a quick release of the lease from the body band should a sudden need arise. The device provides for movements made by the person walking the animal to be transmitted to the animal minimizing the animal's urge to make sudden pulls and/or lunges, thus making animal walking a more comfortable, safe, and healthy experience. The belt part of the device is wide enough provide support to the user's back and abdomen and to prevent the belt from "digging into" the users back when a strong dog pulls against the leash. Moreover, the device is designed to prevent the belt/leash connecting parts from coming into contact with the groin area, which is especially appreciated by male users. The manners in which hook and loop attachments are used provide for rapid release in the event the animal must be quickly separated from the walker. The device is easy and inexpensive to manufacture providing for an affordable hands-free, easy to use, size-adjustable, comfortable to wear, rapid release walking device for a leashed animal.

Turning now to the drawings, FIG. 1a, a plan view, illustrates first leash attachment strap 4a and second leash attachment strap 4b used to attach a leash to the back-support body-band device of the present invention, as is described below. FIG. 1b, a plan view, illustrates first leash attachment strap 4a having first end 3a and second end 7a and second leash attachment strap 4b having first end 3b and second end 7b, as shown in FIG. 1a, securely, yet reversibly, attached to outer side 12a of body-band 12 of the present invention. FIG. 1c, a plan view, illustrates inner side 12b of body-band 12.

In more detail, the hands-free back-supporting body-band animal walking device 10, comprises resilient band 12 having first band end 9a, second band end 9b, first band side 12a, and second band side 12b. In the favored embodiment illustrated, first band side 12a is constructed of loop material. In a particularly favored embodiment, second band side is made of a wicking material so that even in on the warmest days the band does not cause chafing and discomfort as body moisture is wicked away. Fixed to one end of second band side 12b is at least one strip of hook material 18 which provides for rapid detachable attachment and detachment of the band to and from the mid-section of an animal walker by, once the belt is wrapped about the user's body, lightly pressing hook material 18 on the inner surface side (second band side 12b) of the band against the loop material surface of the outer surface side (first band side 12a) of the band.

Fixed on first end 3a of first side 6a of first leash attachment strap 4a and on first end 3b of first side 6b of second leash attachment strap 4b is hook material attachment means material 5. Hook material 5 provides for the leash attachment straps to be rapidly and fixedly attached and rapidly detached to and from first band end 9a and second band end 9b, respectively, of first side 12a of band 12 by simply placing the hook material on the surface of the loop material for attachment purposes and by employing a peeling motion for detachment. It is well-known that the structure of hook and loop attachment means allows for rapid and easy detachment if a peeling-like motion is used to separate the two materials. Thus, to remove the leash attachment straps from the band, they simply have to be peeled from the band. As will be discussed later, unless the peeling action is employed, the leash attachment straps are firmly fixed to the band. A shearing motion, such as that produced when a dog pulls on a leash that is connected to the leash attachment straps, cannot remove the straps.

Connection means 2 are fixed to a second end of each of the first and second leash attachment straps providing for detachable attachment of a leash attachment means 30 (see FIG. 3) wherein leash attachment 30 means provides for attachment of a leash to the device. Connection means 2 may be any type of loop or ring desired. The materials used to construct such rings are varied and include materials such as canvas, plastic, metal, and other materials that would provide the utility obviously required to provide an attachment. This kind of attachment means is well known in the art and need not be discussed further here.

Once the band is sized adjusted about a user's waist and the leash attachment straps are attached to the band, the device is ready for a leash to be attached to the device using the leash attachment means. Experience has shown that if the leash attachment straps are, at this point, attached to each other they will be kept positioned away from the groin area of the walker's body while an animal is being walked providing a considerable amount of comfort to a walker, especially to male walkers. The leash attachment straps can be kept attached to each other by using hook and loop means. Hook material 16a is fixed proximate to second end 13b of first side 6a of leash attachment strap 4a and loop material is fixed proximate to second end 13b of first side of leash attachment strap 4b providing for detachable attachment of the first and said second leash attachment straps to each other. FIG. 2, a perspective view, illustrates means 20 which may be optional or additional means of attaching leash attachment straps to each other.

Figure 3:
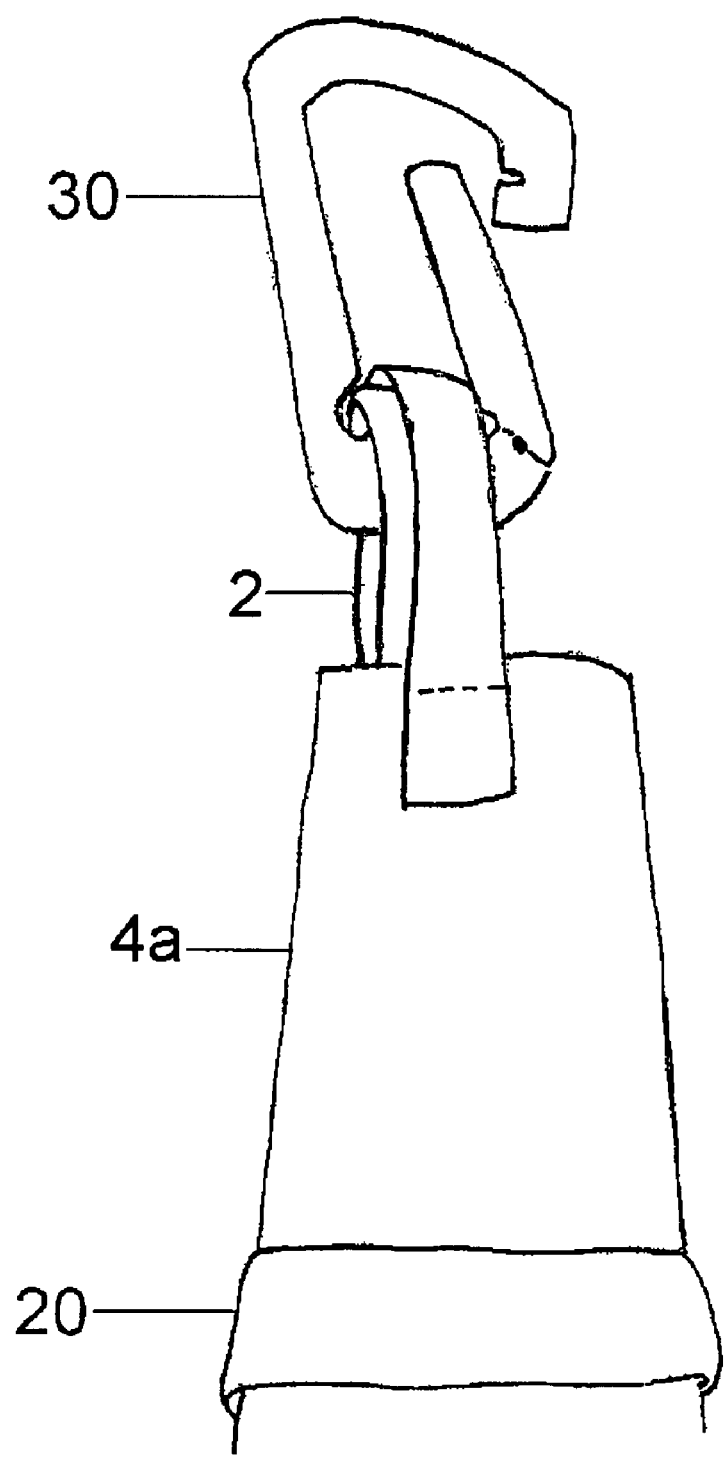
FIG. 3 is a plan view illustrating exemplary leash attachment means 30 for attaching a leash to the back-support body-band device.

FIG. 3, a plan view, illustrates exemplary leash attachment means 30 for attaching a leash to the back-support body-band device. In the embodiment illustrated, the leash attachment means is a carabiner. A carabiner or karabiner is a metal loop with a sprung or screwed gate. It quickly and reversibly connects components in safety-critical systems, such as to attach an animal walking leash to the device of the present invention. There are many loop type connectors that will perform this function. This is a well-known art and any known, or yet to be known, hardware that easily, rapidly, and securely is able to connect a leash with a connection means such as any type of loop or ring desired is contemplated for use with this invention.

Figure 4:
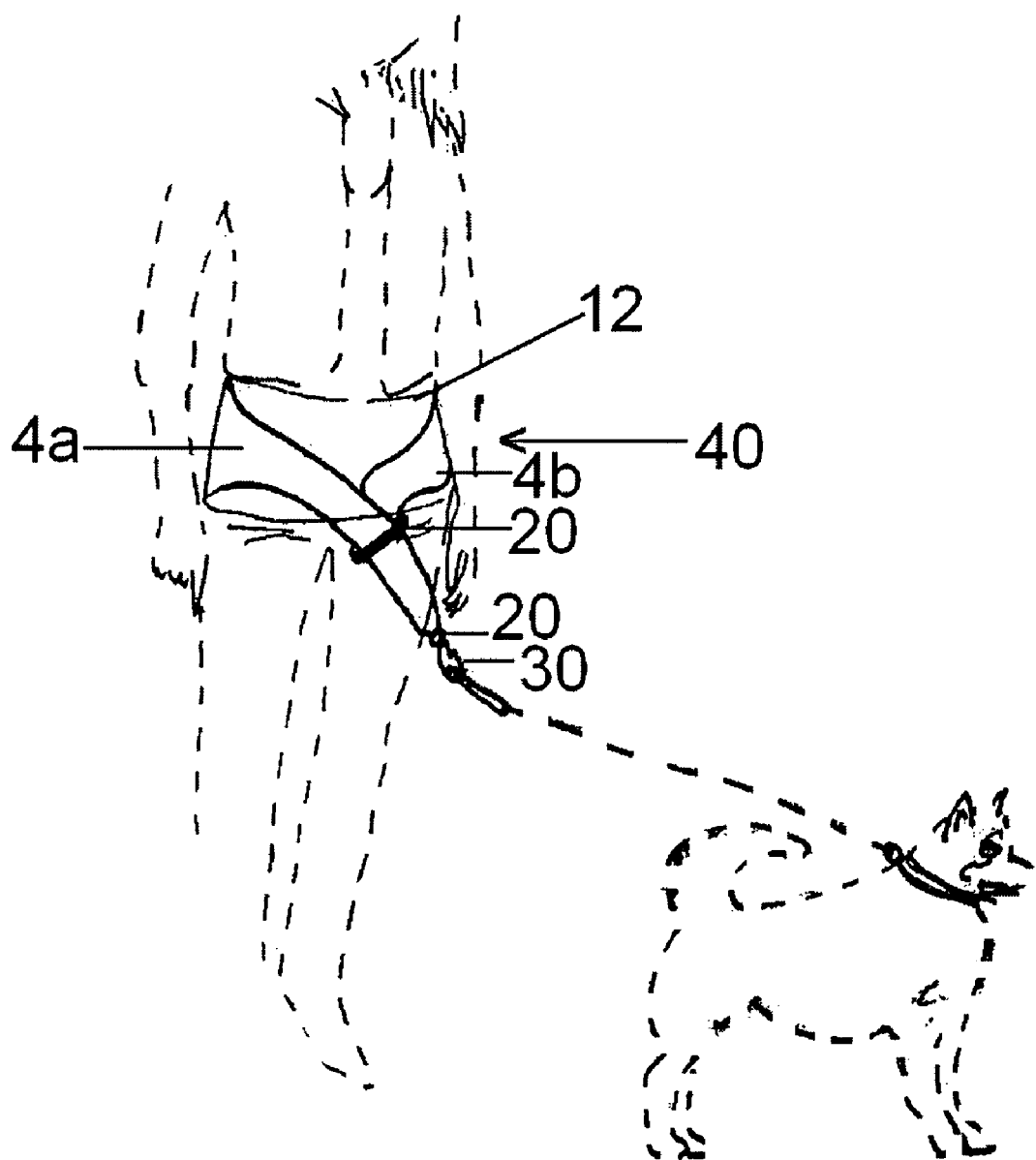
FIG. 4 is a view illustrating the invention in use.

FIG. 4 is a view illustrating the invention 40 in use with band 12 size-adjusted about the user, leash attachment straps 4a and 4b attached to band 12 and to each other. In this example, the user is taking advantage of supplementary leash attachment means 20 to assure the attachment of leash attachment straps 4a and 4b to each other to prevent the straps from entering the groin area and causing discomfort to the user. Ring-like means 2 is shown holding leash attachment means 30 which in turn is attached to a leash which is attached to an animal, which in this case is a dog. The use of leash attachment means 20 is optional. If, for any reason, the user would need to disengage himself or herself from the animal being walked, he or she would simply have to grasp leash attachment straps 4a and 4b and peel the straps away from band 12. For those who walk their animals when light is low, the device may be equipped with at least one strip of reflective material providing a degree of safety for user and animal.

Figure 5:
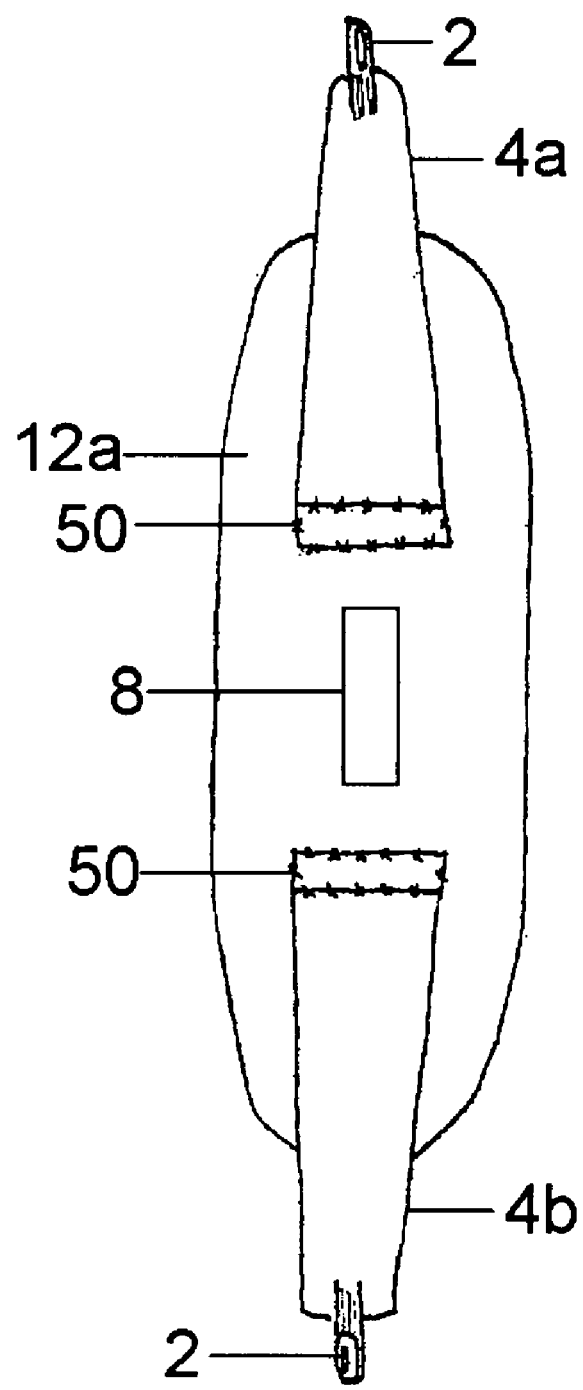
FIG. 5 is a plan view illustrating the first and second leash attachment straps attached to the back-support body-band device by stitching means.

FIG. 5, a plan view, illustrates the first and second leash attachment straps 4a and 4b attached to the back-support body-band device by stitching means. This optional alternate means is available for those who do not wish to use the hook and loop attachment means.

Figure 6:
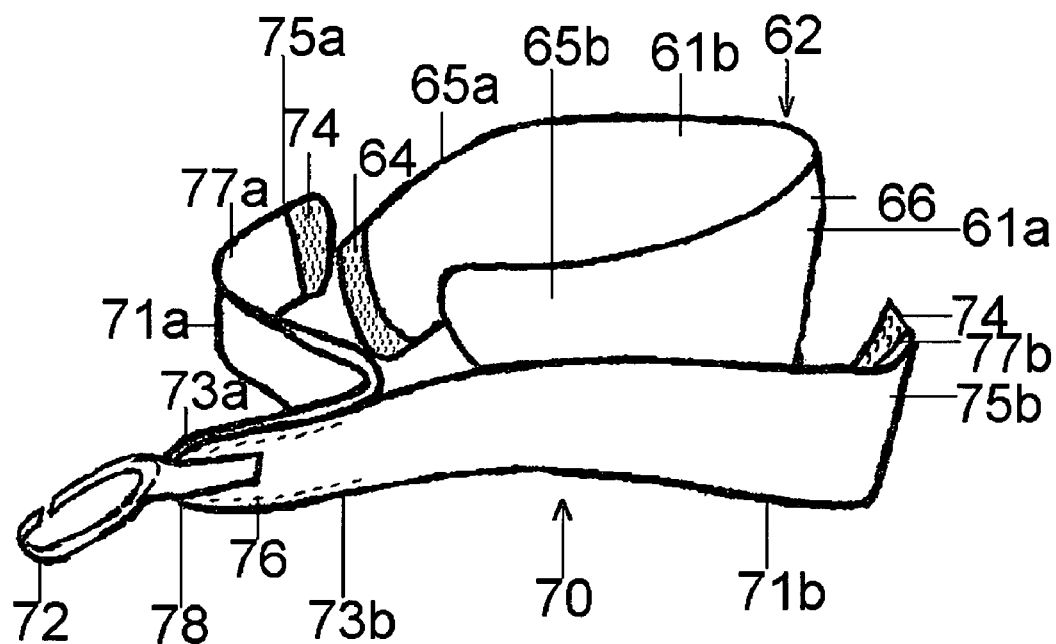
FIG. 6 is a plan view illustrating a two-piece hands-free dog back-support body-band dog-walking device.

FIG. 6, a plan view, illustrates a two-part, quick-release, hands-free, back and abdominal supporting, body-band, dog-walking device 60. The first part comprises a resilient band 62 having a width, a first end 65a and a second end 65b, and a first side 61a and a second side 61b, loop material 66 on the first side 61a, that is, in this illustration, the side of the body band that is away from the body when the band is secured to a user's mid-section, and at least one strip of hook material 64 on the second side 61b, or as illustrated on the inside of the body band 62, which hook 64 and loop 66 attachment means provides for rapid placement of the band on to and removal off of a user's mid-section. The width and the long-lasting resiliency of body band 62 are such that it provides abdominal and back girdle-like support to the user when the band is secured using the hook and loop attachment means about the user's midsection, which increases the safety and the health benefits of the person walking the animal. Having the belt of such a width also, surprisingly and unexpectedly appears to provide more information to the animal being walked regarding the movements of the person walking the animal, so that as the walker slows down, the animal senses the change in velocity and responds accordingly, again making animal walking more safe and more pleasurable. The ability of the belt to transmit the wearer's movements to the dog also reduces or eliminates strain that otherwise could be suffered by animal and/or walker, making walking even more beneficial for the participants. In a favored embodiment, the inner lining of the belt is contemplated to be of any of the well-known wicking materials to keep the walker dry and warm on cool days and dry and cool on warm days.

The second part comprises leash attachment strap 70, said strap having strap end 75a, strap end 75b, and mid-section 78; an outer side and an inner side; wherein hook material 74 on the inner side of first strap end 75a and hook material 74 on the inner side of second strap end 75b provide for nearly instantaneous attachment and detachment of leash attachment strap 70 to and from the resilient waist band 62. Fixedly affixed to the outer side of mid-section 78 of leash attachment strap 70 is leash attachment means 72 providing for detachable attachment of an animal walking leash to leash attachment strap 70 providing for hands-free walking of an animal constrained to walk in a the path defined by the walker's eyesight. Unexpectedly and surprising, it was found that when the mid-section of the leash attachment strap is folded at its midpoint so that the inner sides of the mid-section parts are face to face in direct contact with each other and in that position are adhered to each other, by stitching 76 for example, the attachment strap is maintained away from the groin area of the walker's body while an animal is being walked alleviating one of the most uncomfortable, and possibly unhealthy, problems posed by presently available dog walking waist belts.

Alternatively, instead of having one long attachment strap folded at its midpoint so that the inside surfaces of the folded midsection parts of the strap abut against each other and are then stitched, or otherwise, fixed in that position, a one piece leash attachment strap may be constructed from two strap parts. In this alternative second side 77a of first end 73a of first strap part 71a is position against and adhered to second side 77b of first end 73b of second strap part 71b to form strap 70 with midsection area 78.

In either case, attachment strap 70 has two ends 75a and 75b that are attachable to and detachable from body band 62. Hook material 74 fixedly attached to second side 77a of second end 75a of first strap part 71a and hook material 74 fixedly attached to second side 77b of second end 75b of second strap part 71b provide for the easy and rapid hook attachment of the strap to the loop material of the first end 65a of first side 61a of band 62 and of hook material 74 of second end 75b of the strap to the loop material of second end 65b first side 61a of band 62, respectively. Hook and loop attachment of attachment strap 70 to band 62 provides for nearly instantaneous release of the animal being walked should the need arise, which is an important safety factor for both animal and walker.

The foregoing description, for purposes of explanation, uses specific and defined nomenclature to provide a thorough understanding of the invention. However, it will be apparent to one skilled in the art that the specific details are not required in order to practice the invention. Thus, the foregoing descriptions of specific embodiments are presented for purposes of illustration and description. They are not intended to be exhaustive or to limit the invention to the precise forms disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. A hands-free back and abdominal supporting body-band animal walking device, comprising:
   a) a resilient band having:
      i) a width;
      ii) a first end and a second end, and
      iii) a first side and a second side, said first band side comprising loop material, and said second band side comprising at least one strip of hook material wherein the connection and separation of the loop material to and from the hook material provide for rapid attachment and detachment of the band about and from an animal walker, and
      said width sufficient to provide abdominal and back support to the user when said band is secured about the user's midsection, b) a leash attachment strap, said strap having:
   i) a first strap end, a second strap end, and a mid-section forming a leash connection part;
   ii) an outer side and an inner side;
   iii) said first strap end and said second strap end providing for attachment of said leash attachment strap to said resilient band, said mid-section of said leash attachment strap forming said leash connection part folded at its midpoint so that the inner sides of the mid-section parts contact and are adhered to each other providing for the attachment strap to be maintained away from the groin area of the walker's body while an animal is being walked, a leash connection means affixed to said leash connection part to form a body-band animal walking device, said leash connection means providing for detachable attachment of an animal walking leash to said body-band animal walking device, said back and abdominal supporting body-band animal walking device providing for hands-free walking of an animal constrained to walk in a path defined by the walker's eyesight.

* * * * *